United States Patent [19]
Ouellette

[11] Patent Number: 5,354,013
[45] Date of Patent: Oct. 11, 1994

[54] TAPE CASSETTE FAST FORWARD CLUTCH

[76] Inventor: Thomas C. Ouellette, 114 E. Candlewick, Apt. 909, Kalamazoo, Mich. 49001

[21] Appl. No.: 76,014

[22] Filed: Jun. 11, 1993

[51] Int. Cl.$^5$ .................................... G11B 23/087
[52] U.S. Cl. ..................... 242/342; 242/46.4; 242/338.3; 360/74.2; 360/132
[58] Field of Search .................... 242/197–204, 242/75.5, 71.8, 46.4, 46.21, 118; 360/132, 96.1, 96.3, 71, 74.2, 93, 74.1, 74.6; 464/30, 89

[56] References Cited

U.S. PATENT DOCUMENTS

| | | | |
|---|---|---|---|
| 3,819,130 | 6/1974 | Moxness | 242/199 |
| 4,472,753 | 9/1984 | Wulfing | 242/198 X |
| 4,482,104 | 11/1984 | Saito | 242/198 |
| 4,512,535 | 4/1985 | Dickson et al. | 242/200 |
| 4,702,434 | 10/1987 | Brauer | 242/198 |
| 4,725,016 | 2/1988 | Marvelli | 242/199 |
| 4,928,905 | 5/1990 | Granzotto et al. | 242/201 |
| 5,005,099 | 4/1991 | Perryman et al. | 360/132 |

*Primary Examiner*—Daniel P. Stodola
*Assistant Examiner*—John Q. Nguyen
*Attorney, Agent, or Firm*—Varnum, Riddering, Schmidt & Howlett

[57] ABSTRACT

A tape cassette having a clutch mounted therein to permit rotation of the base reel and take-up reel in a first direction below a predetermined speed and prohibit rotation of the reels in the first direction above the predetermined speed. The tape comprises a cassette housing, a base reel, a take-up reel and a clutch mounted in the housing. In one embodiment, a spline member is slidably mounted within a sleeve of the take-up reel. The spline member has inwardly extending splines to engage the reel table and outwardly extending guide projections to engage slots formed in the sleeve. The spline member engages the reel table during an operation of the cassette below a predetermined speed. However, upon operation of the tape at a speed faster than the predetermined speed, the spline member moves axially within the sleeve away from the reel table to disengage the take-up reel from the reel table. In a second embodiment, a pawl is pivotally mounted in the housing. Below the predetermined speed of rotation, the pawl rotatively engages the take-up reel and above the predetermined speed of rotation the pawl pivots to engage the base reel to stop rotation of the reels.

24 Claims, 8 Drawing Sheets

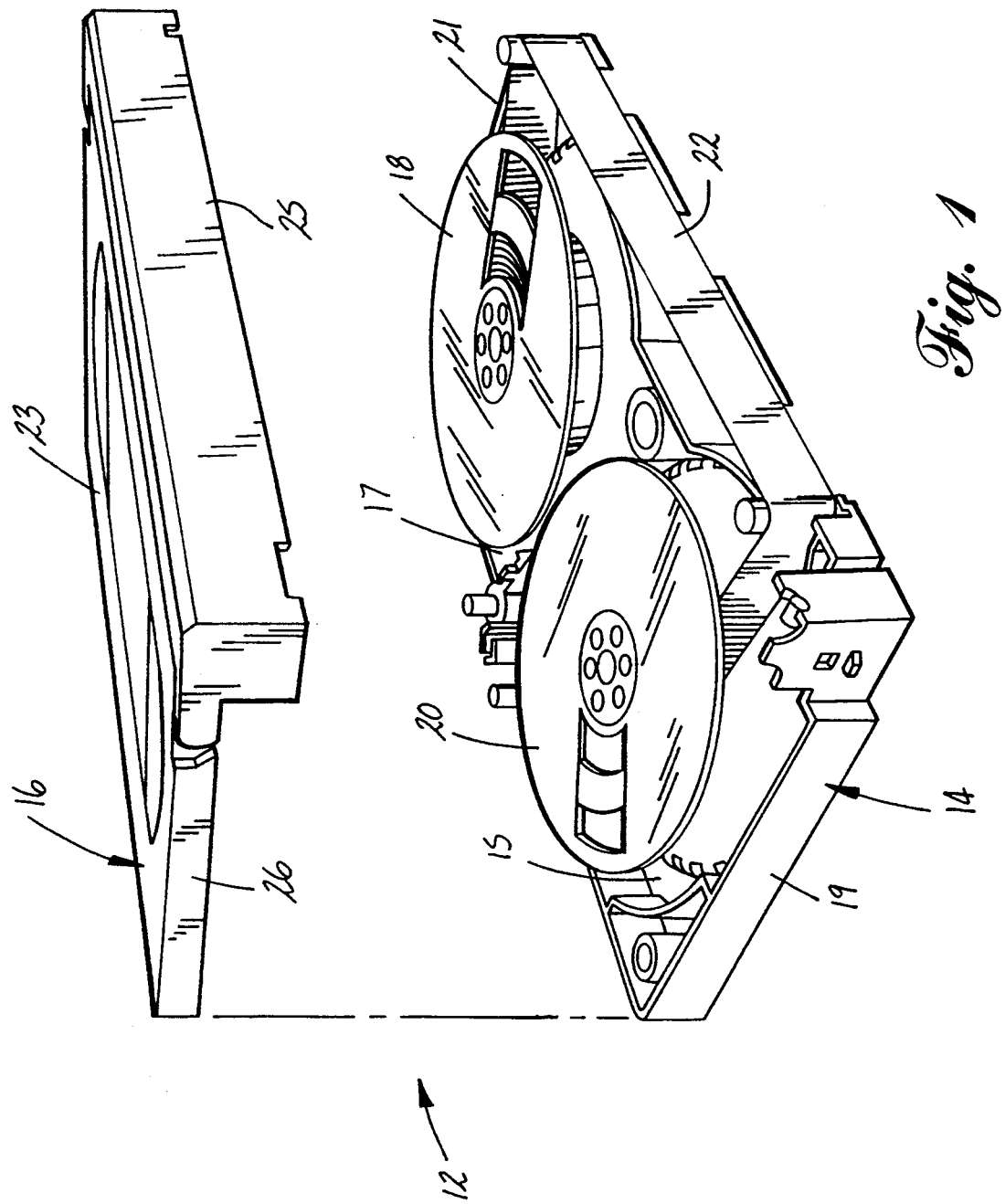

TAPE CASSETTE FAST FORWARD CLUTCH

BACKGROUND OF THE INVENTION

1. Field of the Invention

This invention relates to the construction of a cassette tape housing and, more particularly, to the incorporation of a clutch mounted in the tape housing to restrict operation of the tape in one mode.

2. Description of Related Art

Cassette tapes have found numerous entertainment and educational applications. Cassette tapes are now used for, among other things, videotapes (VHS and 8 mm), magnetic audio tapes, digital audio tapes, and magnetic computer tapes. Perhaps the most extensive application of cassette-type tapes is the VHS videotape cassette. The Hollywood movie studios have made billions of dollars in transferring movies to videotape cassettes for sale and rental.

It is well known that cassette tapes are capable of different modes of operation in multiple speeds. For example, tape can move from a base reel to a take-up reel at a given speed in the "play" mode, and move in the same direction at a faster speed in the "fast forward" mode. Similarly, tape can move from the take-up reel to the base reel in the "rewind" mode. Such modes of operation depend, of course, upon the capabilities of the devices on which the tapes are used. Most devices for consumers use are capable of operating in any of the "play", "fast forward", or "rewind" modes.

A somewhat recent development for the videotape movie industry is the inclusion of advertisements at the beginning of the tape in addition to previews of other movies available on cassette or movies to be released in the near future. Users frequently use the fast forward mode of operation for the videotape cassette to pass over previews and advertisements without viewing them.

Attempts have been made to limit a consumer's ability to control the use of a videotape cassette notwithstanding the device on which it may be operated. For example, U.S. Pat. No. 4,512,535 to Dickson et al. discloses a clutch assembly for a videotape cassette which restricts movement of one of the reels of a cassette tape to rotation in a single direction. If the permitted direction allows only the "play" mode or "fast forward" mode, then the cassette can be viewed only once and cannot be rewound. A similar one-way clutch assembly is seen in U.S. Pat. No. 4,928,905 to Granzotto et al. A clutch assembly is also shown in U.S. Pat. No. 4,725,016 to Marvelli for preventing videotape breakage in a cassette when the videotape reaches the end.

The prior art does not disclose a tape cassette which permits operation in the "play" mode and "rewind" mode, but otherwise disables the "fast forward" mode in the same direction as the "play" mode.

SUMMARY OF INVENTION

According to the invention a clutch is provided within a cassette so that the cassette tape can be operated in a first direction at or less than a predetermined speed but cannot be operated in the first direction at a speed faster than the predetermined speed. For example, the tape can operate in the play mode but cannot be fast forwarded through commercials, warnings or other material recorded on the tape. The clutch, according to the invention, does not impede operation of the tape in a second direction, such as the rewind mode.

A first embodiment of the clutch comprises a slip gear for a take-up reel in a tape. The slip gear comprises a sleeve concentrically mounted within the take-up reel and fixed relative thereto. The sleeve has a plurality of helical slots formed therein. The slip gear also includes a spline member having a plurality of guide projections extending outwardly therefrom. Each guide projection is received in a corresponding one of the plurality of slots. A plurality of inwardly extending splines are formed on the spline member and are adapted to be engaged by a drive member. Upon engagement of the radially inwardly extending splines by the drive member, and rotation of the drive member below a predetermined speed, the spline member and take-up reel will rotate with the drive member. Upon rotation of the drive member at or above a predetermined speed, the spline member will be thrust longitudinally within the sleeve away from engagement with the drive member so that the spline member and take-up reel will not rotate with the drive member.

A second embodiment of the clutch according to the invention comprises a pawl pivotably mounted in the cassette housing for movement between a first position and a second position. The pawl has a gear rotatively mounted thereto and a stop flange mounted thereto. The gear is adapted to selectively and rotatively engage either the take-up reel or base reel when the pawl is in the first position. The stop flange is adapted to selectively engage the opposite reel from the one engaged by the gear when the pawl is in the second position. The pawl is in the first position during rotation of the base reel and take-up reel at a speed at or less than a predetermined speed of rotation. The pawl is received in a second position during rotation of the base reel and take-up reel at a speed faster than the predetermined speed of rotation. The pawl pivots between the first and second positions as a result of the increased centrifugal force exerted by the reel on the gear during rotation above the predetermined speed.

In another aspect of the invention, a spring biases the pawl such that the gear engages one of the reels during rotation below the predetermined speed.

BRIEF DESCRIPTION OF THE DRAWINGS

The invention will now be described with reference to the drawings wherein:

FIG. 1 is a perspective view of a typical videotape cassette housing with the lid removed incorporating a clutch according to the invention;

DESCRIPTION OF THE PREFERRED EMBODIMENTS

Figure 3:
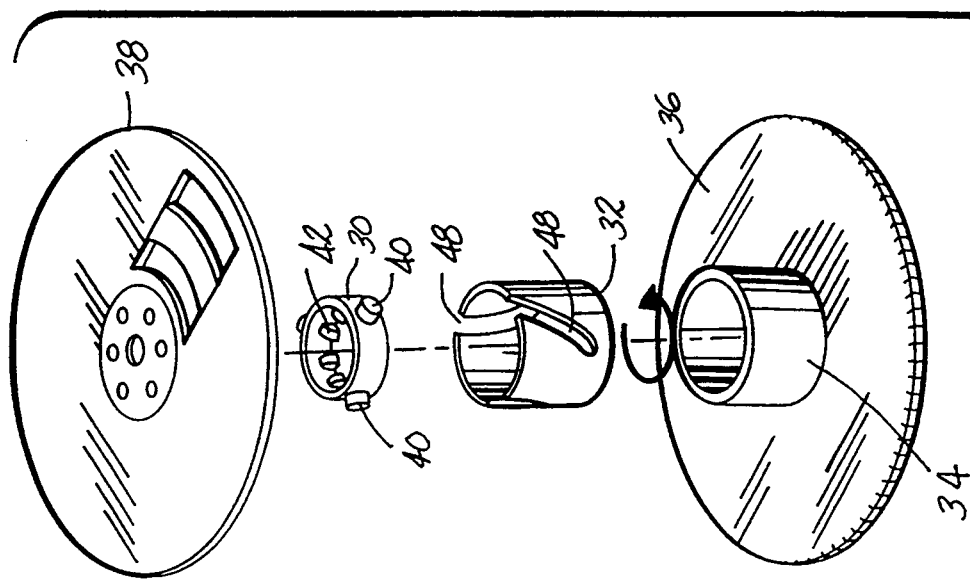
FIG. 3 is a perspective assembly view of the clutch and take-up reel according to the invention.

Referring now to the drawings and to FIG. 1 in particular, a typical VHS videotape cassette 12 comprises a housing having a bottom half 14, a top half 16, a base reel 18, a take-up reel 20, and a length of tape 22. The reels 18, 20, are rotatively mounted in the housing, one end of the tape 22 being mounted to the base reel 18 while the other end of the tape 22 is mounted to the take-up reel 20.

The bottom half 14 of the cassette housing comprises a bottom wall 15, a rear wall 17 and two side walls 19, 21. The top half 16 of the housing comprises a top wall 23, a pivotably mounted door 25, a rear wall (not shown) and a pair of opposed side walls 26.

In a typical videotape cassette player, a pair of reel tables are used, each having a spindle with radially extending splines. Each spindle is selectively received in a bore on the bottom of a corresponding reel 18, 20 and through an aligned opening ira the bottom wall 15. As described further below, the base of each reel 18, 20 has means such as splines to interengage with the spindles. The reel tables thereby impart rotation to the reels and transfer the tape from one reel to the other.

Most videotape cassette players have several different modes of operation, typically including the play, fast forward, rewind, flying search forward and flying search reverse modes. The tape is transferred from the base reel 18 to the take-up reel 20 in the play and fast forward modes of operation of the cassette player. The tape is transferred from the take-up reel 20 to the base reel 18 in the rewind mode. In the play mode, the reel table engaging the take-up reel 20 provides rotation to enable a tape speed of approximately 1-3 inches per second in the conventional standard speed. In a fast forward mode, the speed of rotation supplied by the reel table to the take-up reel 20 is significantly faster, enabling tape speed in the range of 11.7 to 26.9 (inches per second). In the flying search forward mode, the speed of rotation is somewhere between the play mode and the fast forward mode, approximately 11.7 inches per second. In the flying search forward and flying search reverse mode, the recorded picture may still be viewed, perhaps somewhat scrawled, on the television or monitor. In the rewind and flying search reverse mode, the rotating force is applied to the base reel 18 by the interengaging reel table. The speed of rotation in the rewind mode provides a tape speed of 11.7 to 26.9 inches per second and the flying search reverse approximately 11.7 inches per second.

Figure 2:
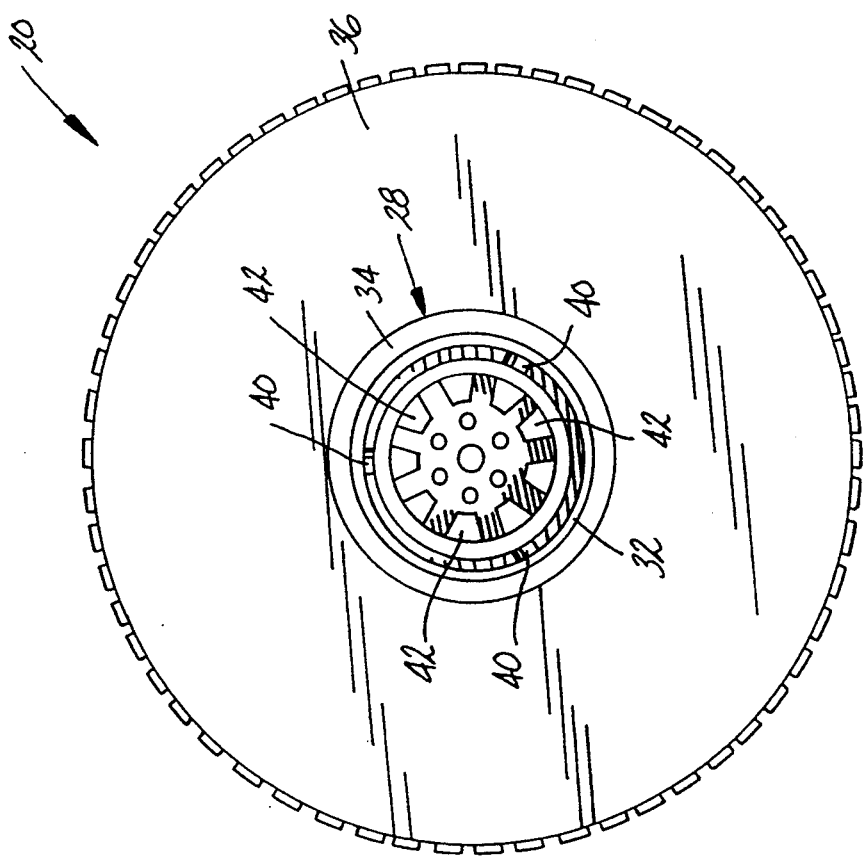
FIG. 2 is a bottom view of the take-up reel of a videotape cassette showing the clutch according to the invention.

As seen in FIGS. 2 and 3, a first embodiment of the clutch according to the invention comprises a slip gear 28 mounted in the take-up reel 20. The slip gear 28 comprises a spline member 30 which is slidably mounted within a sleeve 32. The spline member 30 and sleeve 32 are telescopically received within the hollow core 34 of the take-up reel 20. The core 34 is mounted between the top half 38 and the bottom half 36 of the take-up reel.

The spline member 30 is preferably ring-shaped and has a plurality of outwardly extending guide projections 40 and a plurality of inwardly extending splines 42. In a preferred embodiment, three guide projections 40 and eight splines 42 are incorporated on the spline member 30. Preferably, the guide projections 40 are made of a frictionless plastic material such as nylon.

Figure 7:
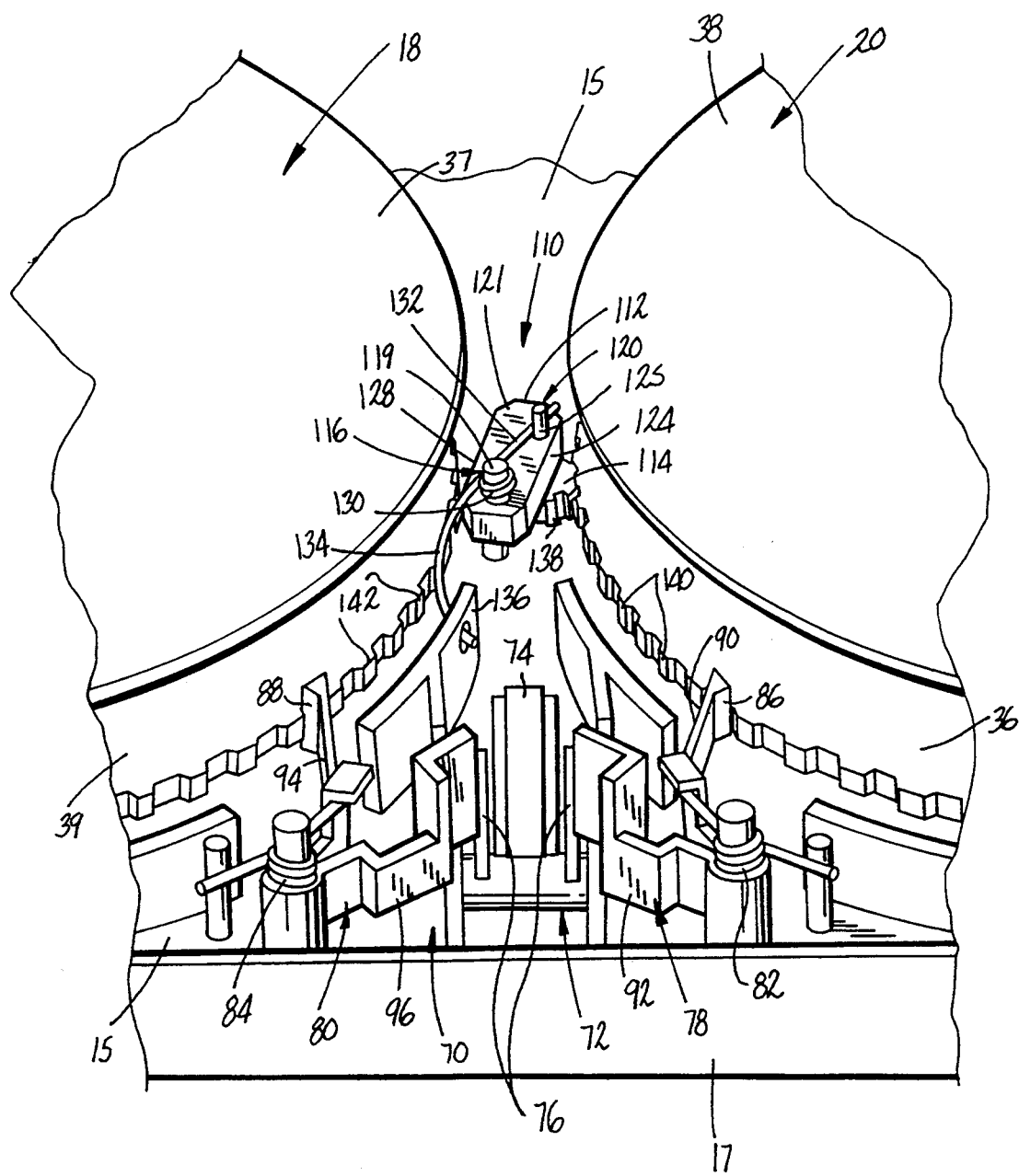
FIG. 7 is a perspective view of a second embodiment of the clutch according to the invention.

The sleeve 32 preferably comprises a hollow cylinder-shape having an inside diameter slightly larger than the outside diameter of the circular spline member 30. A plurality of slots 48 are formed in the sleeve, the number of slots 48 corresponding to the number of guide projections 40 of the spline member 30. The width of the slots 48 is slightly greater than the width of the guide projections 40. Preferably, the slots are formed at an angle relative to the longitudinal axis of the sleeve 32, the angle being in the range of 30° to 55°. As seen in FIG. 7, the leading edge 50 of the slot is arcuate in shape. Experimentation has shown that an arc-shaped slot approximating a parabolic curve provides the best results for the slip gear.

Figure 4:
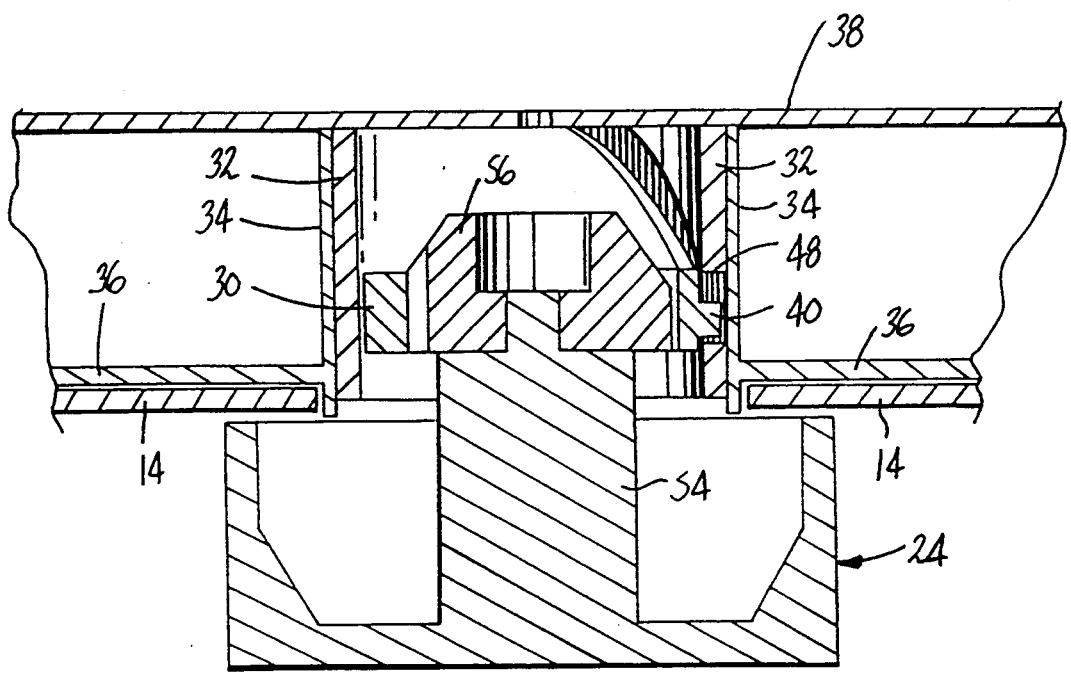
FIG. 4 is a partial sectional view of the clutch according to the invention and a reel table of a video cassette player with the spline member engaging the reel table.

As described above, reel-tables of the cassette player selectively engage the reels to impart rotation to the reels. As seen in FIG. 4, a conventional reel table 24 has a shaft 54 and a conical tip 56 mounted thereon. A plurality of outwardly extending splines 58 are mounted on the shaft 54 at the base of the conical tip 56. During operation, the splines 58 of the reel table 24 engage and interlock with the splines 42 of the spline member 30 thereby selectively interlocking the reel table 24 and the take-up reel 20.

During the "play" mode the reel table 24 rotates the take-up reel 20 and the slip gear 28 in the direction of arrow C, as seen in FIG. 3. The interengaged structure of the reel table 24 and slip gear 28 during the play mode is seen in FIG. 4. In this mode, the force of rotation of the reel table 24 is transferred to the spline member 30 via the interengaging splines, 42, 58. The guide projections 40 of the spline member 30 bear against the leading edges 50 of the slots 48 and transfer the force of rotation to the sleeve 32 mounted to the take-up reel 20. Therefore, the tape 22 is wound from the base reel 18 to the take-up reel 20.

Figure 5:
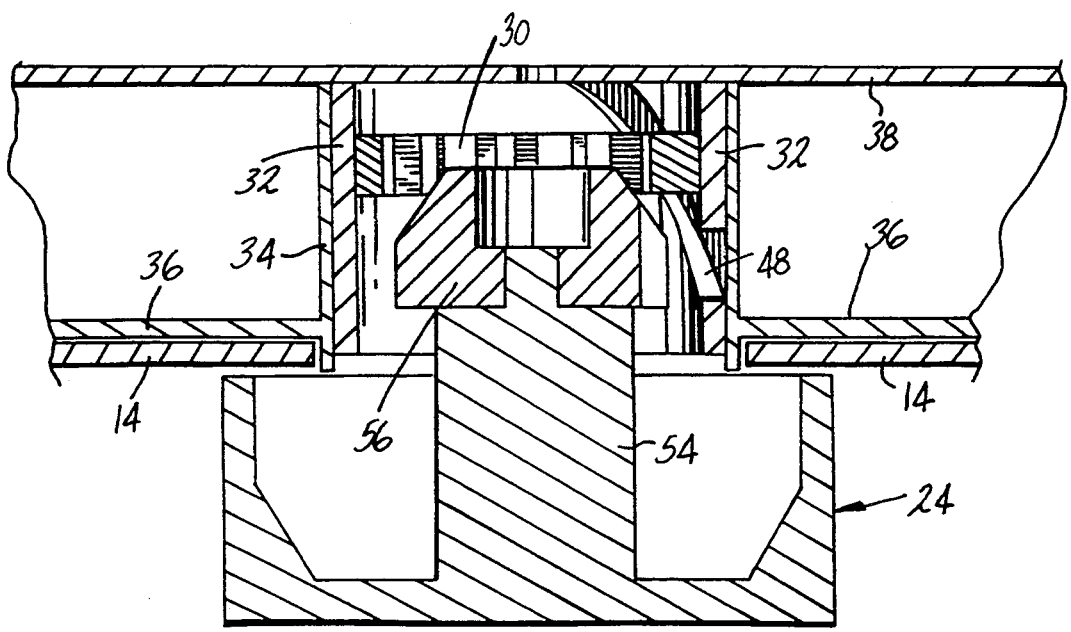
FIG. 5 is a partial sectional view of the clutch and reel table as seen in FIG. 4 with the spline member disengaged from the reel table.
Figure 6:
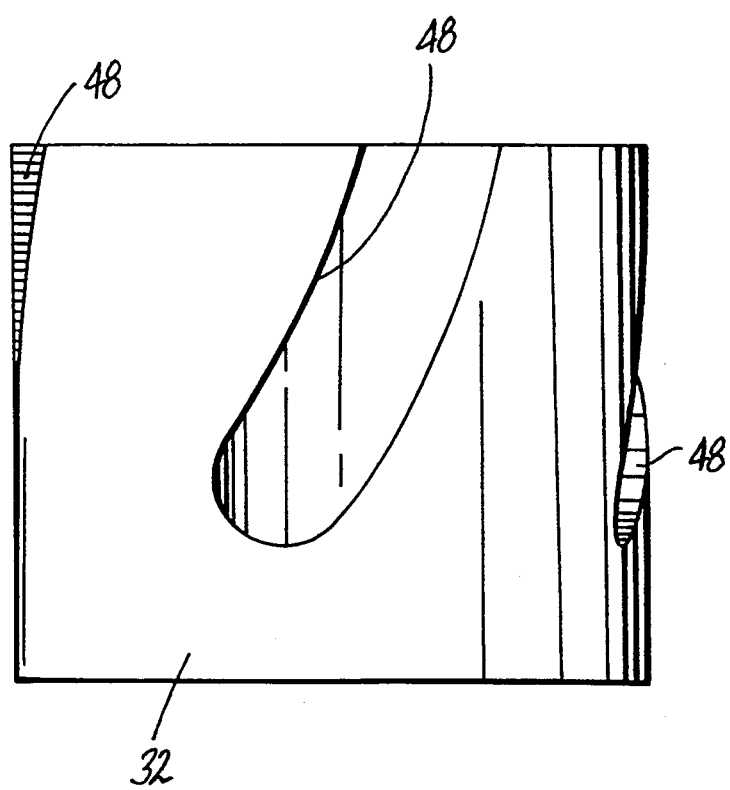
FIG. 6 is a side elevational view of the sleeve of the clutch showing the arcuate slot formed therein.

As described above, when the cassette player is in the flying search forward mode, the reel table 24 engaging the take-up reel 20 rotates at a faster speed than during the play mode. This increased speed of rotation causes the spline member 30 to move axially within the sleeve relative to the longitudinal axis of the sleeve 32 and the shaft 54 of the reel table 24. The spline member 30 moves a distance sufficient to disengage the splines 42 of the spline member from the splines 58 of the reel table 24. Therefore, the force of rotation of the reel table 24 is no longer transferred to the take-up reel 20 so that the tape 22 will not be advanced from the base reel 18 to the take-up reel 20. It is the centrifugal force of the rotating reel table 24 in conjunction with the angled slots 48 of the sleeve 32 which cause the spline member 30 to disengage from the reel table 24 in the flying search forward mode. The speed of reel table 24 in the fast forward mode is significantly faster than the flying search forward mode. Therefore, the spline member 30 will move axially within the sleeve to disengage the take-up reel 20 from the reel table 24, as seen in FIG. 5, when in the fast forward mode.

The angle of the slots 48 is designed relative to the speed of rotation of the reel table 24 in the flying search forward and fast forward modes. The angle may vary depending upon the particular application. Experimentation has shown that a slot angled approximately 30° to 50° from the longitudinal axis of the sleeve results in the spline member 30 disengaging from the reel table 24 during flying search forward and fast forward operation. Preferably, the leading edge 50 of the slot 48 is arcuate, the arc approximating a parabolic curve.

Most video cassettes incorporate a conventional interlock which prevents the rotation of the base reel 18 and take-up reel 20 when the video cassette is not mounted in a cassette player. A conventional interlock 70 for a standard VHS video cassette is seen in FIG. 7. The interlock 70 comprises a L-shaped actuator 72 rotatively mounted to the bottom half 14 of the housing. The actuator 72 comprises a first leg 74 which extends along the bottom wall 15 and a pair of second legs 76 which extend upwardly, substantially perpendicular to the first leg 74. When the video cassette is mounted in a cassette player, a pin (not shown) extends upwardly through an aperture (not shown) formed in the bottom wall 15 of the housing 14 and engages the first leg 74 of the actuator to pivot the actuator 72. As the actuator 72 is pivoted, the second legs 76 engage a pair of spring-biased interlocking members 78, 80. The interlocking members 78, 80 are generally L-shaped and are biased by a pair of springs 82, 84 such that a locking flange 86, 88 mounted at the terminal end of one leg of each interlocking member 78, 80 engages the teeth of the base reel 18 and take-up reel 20, respectively.

When the video cassette 12 is not received within the video cassette player, the springs 82, 84 bias the locking flanges 86, 88 of the interlocking members 78, 80 into engagement with the teeth of the base reel 18 and take-up reel 20. Therefore, these reels cannot be rotated and the tape cannot be advanced from one reel to the other. However, when the tape has been received in the cassette housing, the pivoting actuator 72 engages the first leg 90, 92 of the interlocking members 78, 80 to pivot the interlocking members such that the locking flanges 86, 88 are disengaged from the base reel 18 and take-up reel 20 thereby permitting the free rotation of the base reel 18 and take-up reel 20.

A second embodiment of the cassette tape fast forward clutch is seen in FIGS. 7–12. Reference numerals of the first embodiment will be used in the second embodiment to identify identical elements of the cassette tape.

Figure 8:
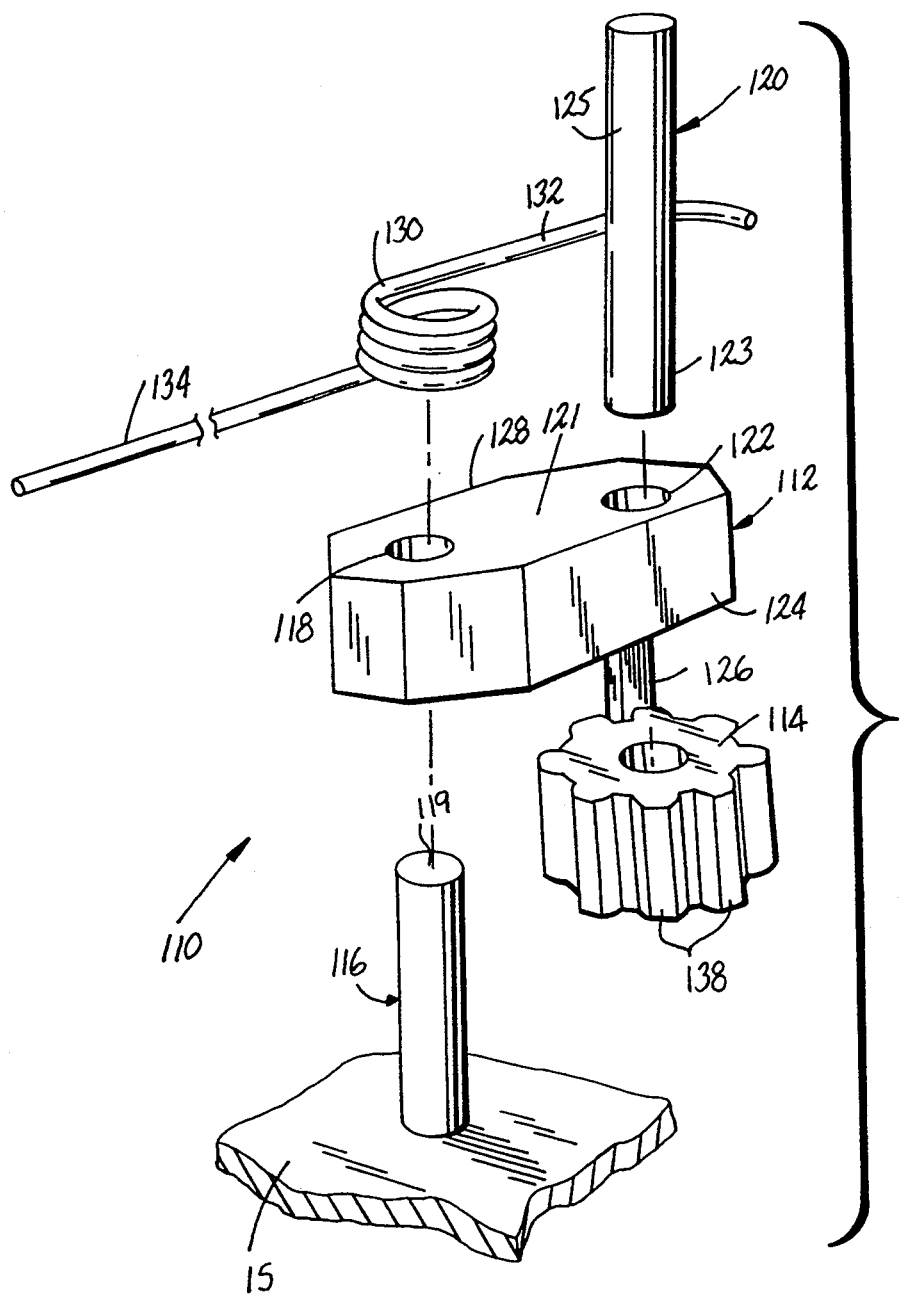
FIG. 8 is an exploded fragmentary view of the clutch of the second embodiment according to the invention.

As seen in FIGS. 7 and 8, the second embodiment of the clutch 110 comprises a pawl 112 which supports a gear 114. The pawl 112 is rotatively mounted to a first mounting pin 116 extending upwardly from the bottom wall 15 of the bottom half of the cassette 14. The pin 116 is received in a first pin aperture 118 formed along the center line of the pawl 112 such that the top of the pin 119 extends above the top surface 121 of the pawl 112 a short distance. A second mounting pin 120 is fixedly mounted in a second pin aperture 122 formed in the pawl 112. The second pin aperture 122 is spaced laterally from the center line of the pawl 112 such that it is closely adjacent to the first side 124 of the pawl 112. The second mounting pin 120 is securely mounted to the pawl such that a lower portion 123 of the second mounting pin 120 extends below the pawl 112 and a top portion 125 of the pin 120 extends above the top surface 121 of the pawl 112. The gear 114 is rotatively mounted to the portion 123 of the second mounting pin 120. A stop flange 126 is mounted to and extends downwardly from the second side 128 of the pawl 112, the second side 128 being opposite the first side 124 and the gear 114. A spring 130 is received on the top portion 125 of the pin 116. A first arm 132 of the spring 130 engages the top portion 125 of the second mounting pin 120 and a second arm 134 of the spring 130 engages a flange 136 extending upwardly from the bottom wall 15 of the bottom half 14 of the housing. The spring 130 is adapted to bias the pawl 112 such that the teeth 138 of the gear 114 engage the teeth 140 of the bottom half 36 of the take-up reel 20. Preferably, the gear teeth 138 and reel teeth 140 are trapezoidal in shape. The trapezoidal shape results in efficient engagement of the gear teeth 138 and reel teeth 140.

In the play mode, the tape is transferred from the base reel 18 to the take-up reel 20 by the driving motion provided by the reel table 24 (FIG. 4) received in the take-up reel 20. Conventional video cassette players include a clutch or other safety mechanism which will disengage the force of rotation applied to the take-up reel by the reel table 24 (FIG. 4) if a certain amount of resistance or sudden change in resistance in transferring the tape from the base reel 18 to the take-up reel 20 is experienced. This safety measure is designed to prevent damage to a tape if the tape jams or too much stress is placed on a tape. The clutch 110 of the second embodiment takes advantage of this safety device within the cassette player to prevent the user from operating the machine in a fast forward mode.

Figure 9:
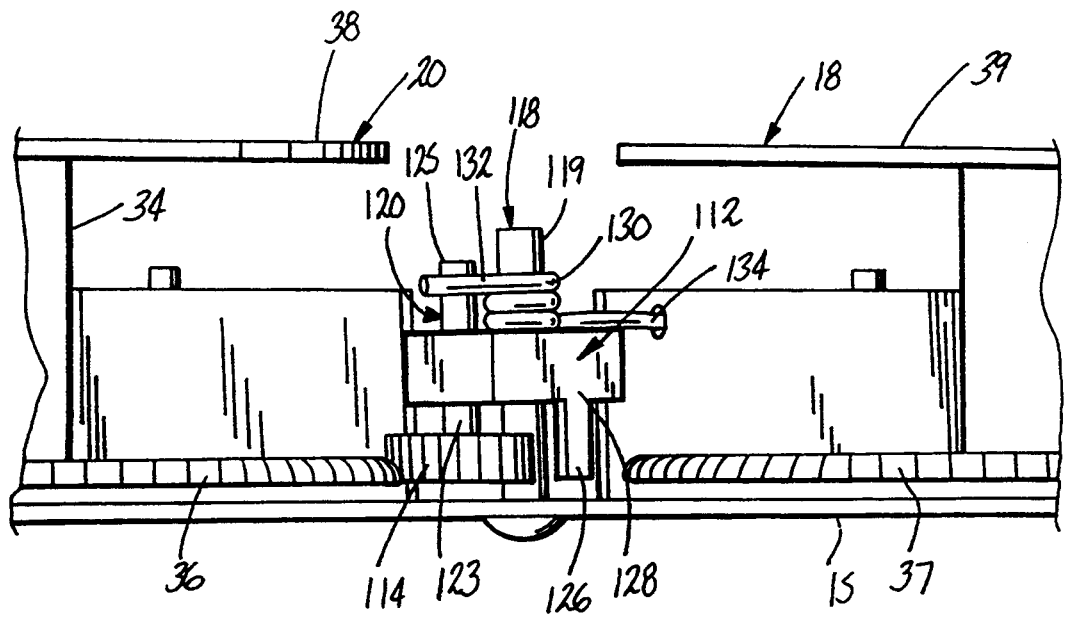
FIG. 9 is a side elevational view of the clutch of the second embodiment in the play or stop modes.
Figure 10:
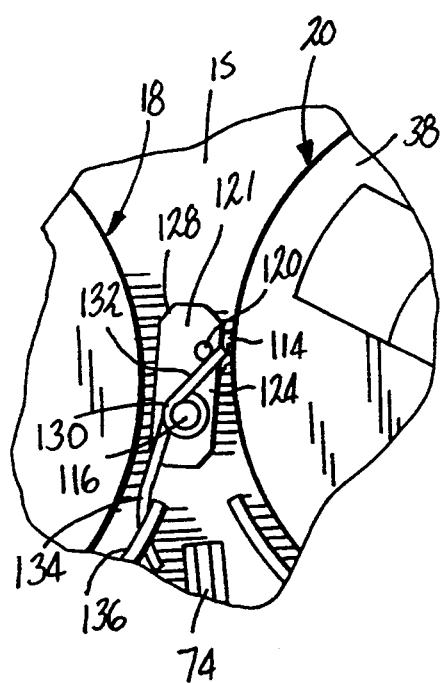
FIG. 10 is a top plan view of the clutch as seen in FIG. 9.
Figure 11:
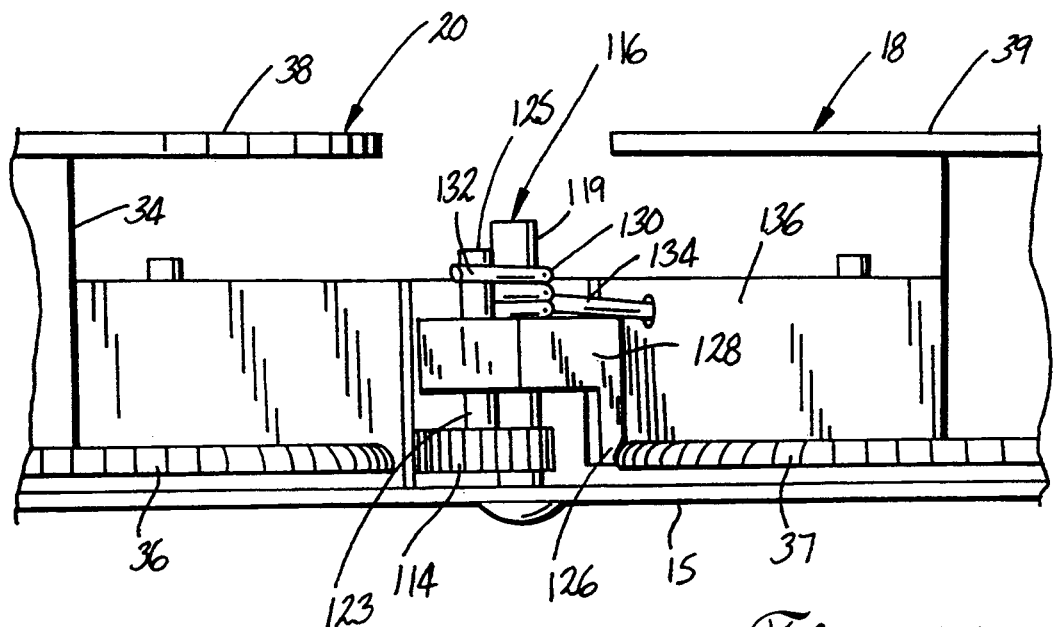
FIG. 11 is a side elevational view of the clutch of the second embodiment in the fast forward mode.
Figure 12:
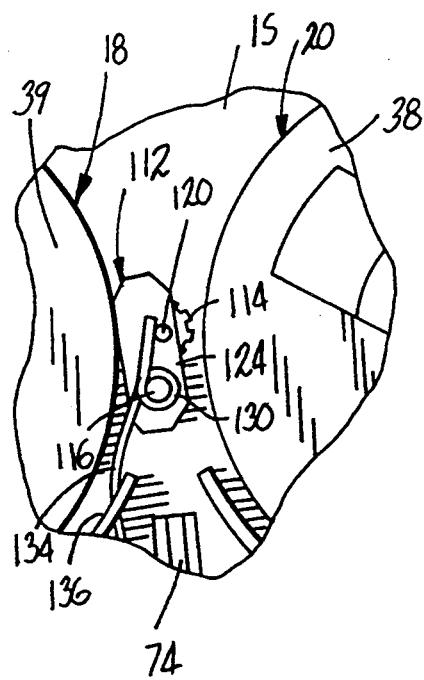
FIG. 12 is a top plan view of the locking arm as seen in FIG. 11.

As the cassette operates in the play mode, as seen in FIGS. 7, 9 and 10, the take-up reel 20 rotates in a clockwise direction. In the play mode, the spring 130 biases the pawl 112 such that the gear 114 engages the bottom half 36 of the take-up reel 20. The teeth 140 of the take-up reel engage the teeth 138 of the gear 114 and therefore the gear 114 rotates in a counter-clockwise direction. When the user switches to the fast forward mode or any mode which increases the speed of rotation of the take-up reel 20 beyond the predetermined play speed, this increased speed of rotation will be transferred to the gear 114. As the speed of rotation increases, the eccentric mounting of the gear 114 on the pawl 112 and the increased centrifugal force created as a result of the increased speed of rotation is transferred to the gear 114 and pawl 112 from the take-up reel 20 which causes the pawl 112 to pivot about the axis of the first mounting pin 116. The pawl pivots out of engagement with the take-up reel 20 until the stop flange 126 of the pawl 112 engages the teeth 142 of the bottom of the base reel 18, as seen in FIGS. 11 and 12. When the stop flange engages the bottom half 39 of the base reel 18 which is rotating in the opposite direction from the gear 114, then the clutch or safety feature within the cassette player will immediately disable the force of rotation supplied to the reel table 24 (FIG. 4) engaging the take-up reel 20. Therefore, when a user switches to the fast forward mode, the video cassette player will operate in the fast forward mode only long enough for the centrifugal force to reach a level to cause the pawl 112 to pivot out of engagement with the take-up reel and into momentary engagement with the teeth 142 of the base reel 18. Once the base reel 18 and take-up reel 20 cease rotating, the spring 130 biases the pawl 142 back to its initial position wherein the gear 114 engages the bottom 36 of the take-up reel 20. Now, the user can again resume operation in the play mode.

With a clutch according to the invention incorporated into a tape cassette, the user of the tape is effectively prevented from fast forwarding the tape. Thus, notices, instructions or other material on the tape stand a greater chance of being viewed by the user.

The two embodiments described above relate to a VHS videotape cassette. However, the clutch according to the invention can be incorporated in any cassette-type tape. For example, the clutch can easily be incorporated into an 8 mm videotape cassette, a magnetic audio tape, or a digital audio tape. In each of these instances, a reel table with outwardly extending splines is inserted into the take-up reel having cooperating inwardly extending splines. The speed of rotation in the fast forward and flying search forward modes is significantly greater than the play mode and therefore a cassette tape having a clutch according to the invention could be used to prohibit fast forward or flying search operation of the cassette tape.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. A tape cassette adapted to be received in a tape cassette player, the cassette comprising:
   a housing;
   a base reel rotatably mounted in the housing;
   a take-up reel rotatably mounted in the housing beside the base reel;
   a length of tape having a first end, a second end and a body intermediate the first and second ends, the first end being mounted to the base reel, the second end being mounted to the take-up reel and the body being adapted to be transferred between the base reel and take-up reel through rotation of the base reel and take-up reel, the force of rotation being supplied to at least one of the base reel and take-up reel by a driving means in the cassette player; and
   a clutch mounted in said housing in a position to permit rotation of one of the base reel and take-up reel in a first direction by the driving means at and below a predetermined speed of rotation and effectively disable rotation of said one of the base reel and take-up reel in the first direction above the predetermined speed of rotation, wherein the clutch does not contact the tape.

2. A tape cassette according to claim 1 wherein said clutch comprises;
   a pawl pivotally mounted in said cassette housing for movement between a first position and a second position, the pawl having a gear rotatively mounted thereto and stop flange mounted thereto, the gear being adapted to selectively and rotatively engage one of the take-up reel and base reel when the pawl is in the first position and the stop flange adapted to selectively engage the other of the base reel and take-up reel when the pawl is in the second position;
   wherein the pawl will be in the first position during rotation of the base reel and take-up reel at a speed at or less than the predetermined speed of rotation and the pawl will be thrust toward the second position when the base reel and take-up reel rotate at a speed faster than the predetermined speed of rotation.

3. A tape cassette according to claim 2 and further comprising a spring to bias the pawl such that the gear engages one of the base reel and take-up reel during rotation of the base reel and take-up reel below the prescribed speed of rotation.

4. A tape cassette according to claim 2 wherein said the cassette housing further comprises a first mounting pin adapted to pivotally receive the pawl.

5. A tape cassette according to claim 2 wherein said pawl further comprises;
   first and second sides, the sides being opposed to one another; and
   a second mounting pin having a first end and a second end, the first end being mounted to the pawl adjacent the first side of the pawl and a second end adapted to rotatively receive the gear.

6. A tape cassette according to claim 5 wherein said stop flange is mounted to the second side of the pawl.

7. A tape cassette according to claim 1 wherein said clutch comprises;
   a slip gear mounted in an axial central bore of the take-up reel, the slip gear comprising;
   a sleeve having an axis of rotation, the sleeve being concentrically mounted in said central bore of the take-up reel and having a plurality of helical slots formed therein; and
   a spline member selectively mounted in the sleeve and adapted to be received in first and second positions, the spline member having a plurality of guide projections extending outwardly therefrom and a plurality of splines extending radially inwardly therefrom, each guide projection being received in a corresponding one of said plurality of helical slots of the sleeve and the splines adapted to engage the cassette player and transfer a force of rotation from the cassette player to the take-up reel in the first position and disengage from the cassette player in the second position;
   wherein the spline member is received in the first position during rotation of the take-up reel at a speed at or less than the predetermined speed of rotation and the spline member is received in the second position when the take-up reel is rotated at a speed faster than the predetermined speed of rotation, the guide projections of the spline member rotating within the helical slots of the sleeve from the first position to the second position as a result of the increased centrifugal force exerted on the take-up reel by the cassette player when the speed of rotation exceeds the predetermined speed of rotation.

8. A tape cassette according to claim 7 wherein the slots are formed at an angle in the range of 30 to 55 degrees relative to the longitudinal axis of the sleeve.

9. A tape cassette according to claim 8 said slots are arcuate in shape.

10. A tape cassette according to claim 8 further comprising three helical slots formed in the sleeve and three guide projections formed on the spline member.

11. A tape cassette according to claim 7 wherein said guide projections are formed from nylon.

12. A tape cassette according to claim 1 wherein the tape cassette comprises a videotape cassette.

13. A tape cassette adapted to be received in a tape player, the player having reel tables adapted to convey a force of rotation from the player to the tape, the cassette comprising;
- a housing;
- a base reel rotatably mounted in the housing;
- a take-up reel rotatably mounted in the housing beside the base reel and adapted to engage the reel table of the cassette player;
- a length of tape having a first end, a second end and a body intermediate the first and second ends, the first end being mounted to the base reel, the second end being mounted to the take-up reel and the body being adapted to be transferred between the base reel and take-up reel through rotation of the base reel and take-up reel;
- a pawl pivotally mounted in said cassette housing for movement between a first position and a second position, the pawl having a gear rotatively mounted thereto and stop flange mounted thereto, the gear being adapted to selectively and rotatively engage one of the take-up reel and base reel and permit rotation of the base reel and take-up reel in a first direction when the pawl is in the first position and the stop flange adapted to selectively engage the other of the base reel and take-up reel and prohibit rotation of the base reel and take-up reel in the first direction when the pawl is in the second position,
- wherein the pawl will be in the first position during rotation of the base reel and take-up reel at a speed at or less than the predetermined speed of rotation and the pawl will be thrust toward the second position when the base reel and take-up reel rotate at a speed faster than the predetermined speed of rotation.

14. A tape cassette according to claim 13 and further comprising a spring adapted to bias the pawl such that the gear engages one of the base reel and take-up reel during rotation of the base reel and take-up reel below the prescribed speed of rotation.

15. A tape cassette according to claim 13 wherein said the cassette housing further comprises a first mounting pin adapted to pivotally receive the pawl.

16. A tape cassette according to claim 13 wherein said pawl further comprises;
- first and second sides, the sides being opposed to one another; and
- a second mounting pin having a first end and a second end, the first end being mounted to the pawl adjacent the first side of the pawl and a second end adapted to rotatively receive the gear.

17. A tape cassette according to claim 16 wherein said stop flange is mounted to the second side of the pawl.

18. A tape cassette adapted to be received in a tape cassette player, the cassette comprising:
- a housing;
- a base reel rotatably mounted in the housing;
- a take-up reel rotatably mounted in the housing adjacent the base reel;
- a length of tape having a first end, a second end and a body intermediate the first and second ends, the first end being mounted to the base reel, the second end being mounted to the take-up reel and the body being adapted to be transferred between the base reel and take-up reel through rotation of the base reel and take-up reel, the force of rotation being supplied to at least one of the base reel and take-up reel by a driving means in the cassette player;
- a clutch mounted in the take-up reel wherein the clutch does not contact the tape, the clutch comprising;
  - a sleeve having an axis of rotation, the sleeve being concentrically mounted in a central bore of the take-up reel and having a plurality of helical slots formed therein; and
  - a spline member selectively mounted in the sleeve and adapted to be received in first and second positions, the spline member having a plurality of guide projections extending outwardly therefrom and a plurality of splines extending radially inwardly therefrom, each guide projection being received in a corresponding one of said plurality of helical slots of the sleeve and the splines adapted to engage the cassette player and transfer a force of rotation from the cassette player to the take-up reel in the first position and disengage from the cassette player in the second position;
- wherein the spline member is received in the first position during rotation of the take-up reel at a speed at or less than a predetermined speed of rotation and the spline is received in the second position when the take-up reel is rotated at a speed faster than the predetermined speed of rotation, the guide projections of the spline member rotating within the helical slots of the sleeve from the first position to the second position as a result of the increased centrifugal force exerted on the take-up reel by the cassette player when the speed of rotation exceeds the predetermined speed of rotation.

19. A tape cassette according to claim 18 wherein the slots are formed at an angle in the range of 30 to 55 degrees relative to the longitudinal axis of the sleeve.

20. A tape cassette according to claim 19 said slots are arcuate in shape.

21. A tape cassette according to claim 19 further comprising three helical slots formed in the sleeve and three guide projections formed on the spline member.

22. A tape cassette according to claim 18 wherein said guide projections are formed from nylon.

23. A tape cassette according to claim 18 wherein the tape cassette comprises a videotape cassette.

24. A tape cassette adapted to be received in a tape cassette player, the cassette comprising:
- a housing;
- a base reel rotatably mounted in the housing;
- a take-up reel rotatably mounted in the housing beside the base reel;
- a length of tape having a first end, a second end and a body intermediate the first and second ends, the first end being mounted to the base reel, the second end being mounted to the take-up reel and the body being adapted to be transferred between the base reel and take-up reel through rotation of the base reel and take-up reel, the force of rotation being supplied to at least one of the base reel and take-up reel by a driving means in the cassette player; and
- a clutch mounted in said housing in a position to permit rotation of one of the base reel and take-up reel in a first direction by the driving means at and below a predetermined speed of rotation and effectively disable rotation of said one of the base reel and take-up reel in the first direction above the predetermined speed of rotation, wherein the clutch disables rotation of said one of said base reel and take-up reel without the use of a light source mounted in the housing.

* * * * *

UNITED STATES PATENT AND TRADEMARK OFFICE
CERTIFICATE OF CORRECTION

PATENT NO. : 5,354,013

DATED : Oct. 11, 1994

INVENTOR(S) : Thomas C. Ouellette

It is certified that error appears in the above-identified patent and that said Letters Patent is hereby corrected as shown below:

Claim 4, column 4, lines 8 and 9, "wherein said the cassette housing" should read --wherein said cassette housing--.

Claim 9, column 8, line 58, "claim 8 said slots" should read --claim 8 wherein said slots--.

Claim 15, column 19, lines 41 and 42, "wherein said the cassette" should read --wherein said cassette--.

Claim 20, column 10, line 35, "claim 19 said slots" should read --claim 19 wherein said slots--.

Signed and Sealed this

Twenty-eight Day of February, 1995

*Attest:*

BRUCE LEHMAN

*Attesting Officer*      *Commissioner of Patents and Trademarks*